United States Patent [19]

Anikanov et al.

[11] 3,939,961

[45] Feb. 24, 1976

[54] APPARATUS FOR CONVEYING PILES OF NEWSPAPERS IN PERPENDICULAR DIRECTIONS

[76] Inventors: Nikolai Ivanovich Anikanov, Bolshaya Bronnaya ulitsa, 2/6, kv. 6; Leonid Pavlovich Grachev, ulitsa Lva Tolstogo, 7, kv. 32, both of Moscow; Grigory Iosifovich Zax, ulitsa Mechnikova, 14a, kv. 24, Kiev; Grigory Avramovich Radutsky, 16 Parkovaya ulitsa, 49, korpus 2, kv. 68, Moscow; Rafail Efimovich Kheifets, Brest-Litovsky prospekt, 162, kv. 30, Kiev, all of U.S.S.R.

[22] Filed: June 12, 1974

[21] Appl. No.: 478,704

[30] Foreign Application Priority Data
Dec. 21, 1973  U.S.S.R. ............................... 1975407

[52] U.S. Cl. ................. 198/25; 193/36; 198/127 R
[51] Int. Cl.² .................................... B65G 47/54
[58] Field of Search .............. 198/25, 105, 127; 193/35 MD, 36

[56] References Cited
UNITED STATES PATENTS

| | | |
|---|---|---|
| 2,836,284 | 5/1958 | Gilliatt ............................ 198/127 R |
| 2,984,330 | 5/1961 | Billeter ........................... 198/105 X |
| 3,253,697 | 5/1966 | DeGood et al. ................. 198/127 R |
| 3,334,723 | 8/1967 | Reed et al. ...................... 198/127 R |
| 3,420,356 | 1/1969 | DeGood .......................... 198/127 R |
| 3,550,741 | 12/1970 | Sherman ......................... 198/127 R |
| 3,621,982 | 11/1971 | Fleischauer ..................... 198/127 R |
| 3,642,113 | 2/1972 | Bugis .................................... 198/25 |
| 3,782,527 | 1/1974 | Petershack ............................ 198/25 |
| 3,842,962 | 10/1974 | Grachev ................................ 198/25 |

Primary Examiner—Evon C. Blunk
Assistant Examiner—Richard K. Thomson
Attorney, Agent, or Firm—Holman & Stern

[57] ABSTRACT

The invention relates to conveying means and may be used to the utmost effectiveness in automatic continuous lines of performing operations on piles of printed newspapers. The apparatus is provided with a rollerway for conveying piles of newspapers, and discs mounted on respective shafts between the rollers of the rollerway. Each disc has two portions having different profiles, and on one of the portions there is a semicircle, and the other portion a semi-ellipse, with the bisection line extending along the major axis of the original ellipse, and with the length of the minor axis of this ellipse being shorter than the spacing between the axis of the respective shaft and the load-supporting surface of the rollerway. This apparatus ensures the conveying of piles of newspapers without affecting their shape, and which features a simplified structure.

1 Claim, 5 Drawing Figures

APPARATUS FOR CONVEYING PILES OF NEWSPAPERS IN PERPENDICULAR DIRECTIONS

BACKGROUND OF THE INVENTION

The present invention relates to a means for conveying piece loads and, more particularly, to an apparatus for conveying piles of newspapers in perpendicular directions.

The invention may be employed to the utmost effectiveness in automatic continuous lines perfoming operations on printed matter. Such operations may include the assembling of batches, or packages, the packaging of these batches, and their subsequent transportation and handling.

PRIOR TECHNIQUES

At present, the conveying of piece loads in perpendicular directions is effected in a large number of cases by means of a suitable apparatus including a rollerway for conveying the loads in one direction and a means for directing the loads in another direction perpendicular to the first direction.

This means includes a system of rollers arranged along the circumference of a rim positioned in the space between the rollers of the rollerway, approximately at the same level as the last-mentioned rollers. The shaft supporting this rim has a sprocket wheel mounted thereon by means of which the rim is rotated.

The respective sprocket wheels of all the rims mounted in a single space between the rollers of the rollerway are interconnected by the same driving chain which is employed for rotating the rollers of the rollerway.

In order to ensure hindrance-free conveying of the loads along the rollerway, the rims are positioned so that the rollers thereof, which are, at a given moment, at the top of the rim, extend parallel along with the rollers of the rollerway. When the direction of the progress of the loads is to be varied, the drive rotating the rims is engaged into operation.

Since the difference between the top levels of the rollers of the rims, and those of the rollerway, is small, there is a possibility that the loads might lag on the rollerway as the direction of their progress is changed. This possibility is particularly undesirable in cases of conveying piles of newspapers which, due to their small rigidity, have a relatively great area of contact with the rollers of the rollerway.

Furthermore, the above described known means for changing the direction of the progress of the loads have a complicated structure, consisting of several rollers mounted on with each rim, each roller requiring its own bearing means and each row of rims requiring its own drive means.

The above shortcomings may be eliminated to a certain extent by a means for changing the direction of the progress of loads, including discs with planar cutaway portions or flats, with the discs being mounted on a respective shaft in the spaces between the rollers of the rollerway, with these flats of the discs in an inoperative position, extending somewhat lower than the load-supporting surface of the rollerway.

Although the above described arrangement is structurally simple, compact, and provides for directing piles of newspapers off the rollerway, it does not, however, exclude the possibility of the piles being driven off the rollerway, due to the displacement of the bottommost newspaper in the pile as a result of the relatively great horizontal stresses being applied to this newspaper at the initial moment of contact thereof with the flat of the disc. Furthermore, the said load applied to the pile, as it is being lifted by the above described known discs, are excessive due to the point of contact of the disc with the pile being remote from the vertical axis of the disc. This results in a somewhat abrupt lifting of the pile, which might also cause its being offset or even tumbling. Furthermore, should the discs with the flats be arrested in their inoperative position leaving the flats slightly askew, a portion of the flat might project above the load-supporting surface of the rollerway, thus hindering the progress of the piles of newspapers along the rollerway.

OBJECTS AND SUMMARY OF THE INVENTION

It is therefore an object of the present invention to provide an apparatus which is free of the above shortcomings.

It is also an object of the present invention to provide an apparatus for conveying piles of newspapers in perpendicular directions, which ensures the conveyance of piles without affecting their shape.

It is an important object of the present invention to provide an apparatus which is of a simple structure.

These and other objects are attained in an apparatus for conveying piles of newspapers in perpendicular directions, comprising a rollerway for conveying the piles in one direction and a means for directing the piles in another direction, perpendicular to the first direction, including discs mounted in rows on shafts in the spaces between the rollers of the rollerway. In accordance with the present invention, each disc in a radial section includes two portions having different profiles, one portion being a semi-circle, and the other portion being a semi-ellipse, in which the line of bisection extending along the major axis of the ellipse equals the diameter of the semi-circle. The minor axis of the ellipse is shorter than the spacing between the axis of the disc-carrying shaft, and the load-supporting surface of the rollerway, with the shafts carrying the discs extending in the reduced-diameter portions of the rollers of the rollerway, and being associated with the common drive for timed rotation of the discs.

The structure of the present apparatus ensures that the direction of the progress of the piles of papers is changed without the shape of the piles being affected, since the minimized spacing between the axes of rotation of the discs, and the load-supporting surface of the rollerway reduces the horizontal stresses being applied to the pile at the initial moment of its contact with a disc, which prevents the displacing of the bottommost newspaper; it likewise reduces the vertical effort, which results in a smooth lifting of the pile of newspapers, while the elliptic shape of one of the portions of the disc prevents the possibility of a portion of the discs projecting above the load-supporting surface of the rollerway when the discs are arrested in their inoperative position.

Furthermore, the provision of the common drive for the shafts of the discs enables the same to minimize the spacing between the rollers of the rollerway, since it is necessary to position only the discs per se between the rollers. In this way, the reliability of directing the piles in a direction perpendicular to the initial direction is enhanced.

According to another aspect of the present invention, the shafts of the discs are connected with their drive through a single-revolution clutch.

It is expedient that the discs be arranged in a checkered order, and partly overlapping one another.

For the present invention to be better understood, given hereinbelow is a description of an embodiment thereof with reference to the accompanying drawings, wherein:

DETAILED DESCRIPTION OF THE PREFERRED EMBODIMENT

Figure 1:
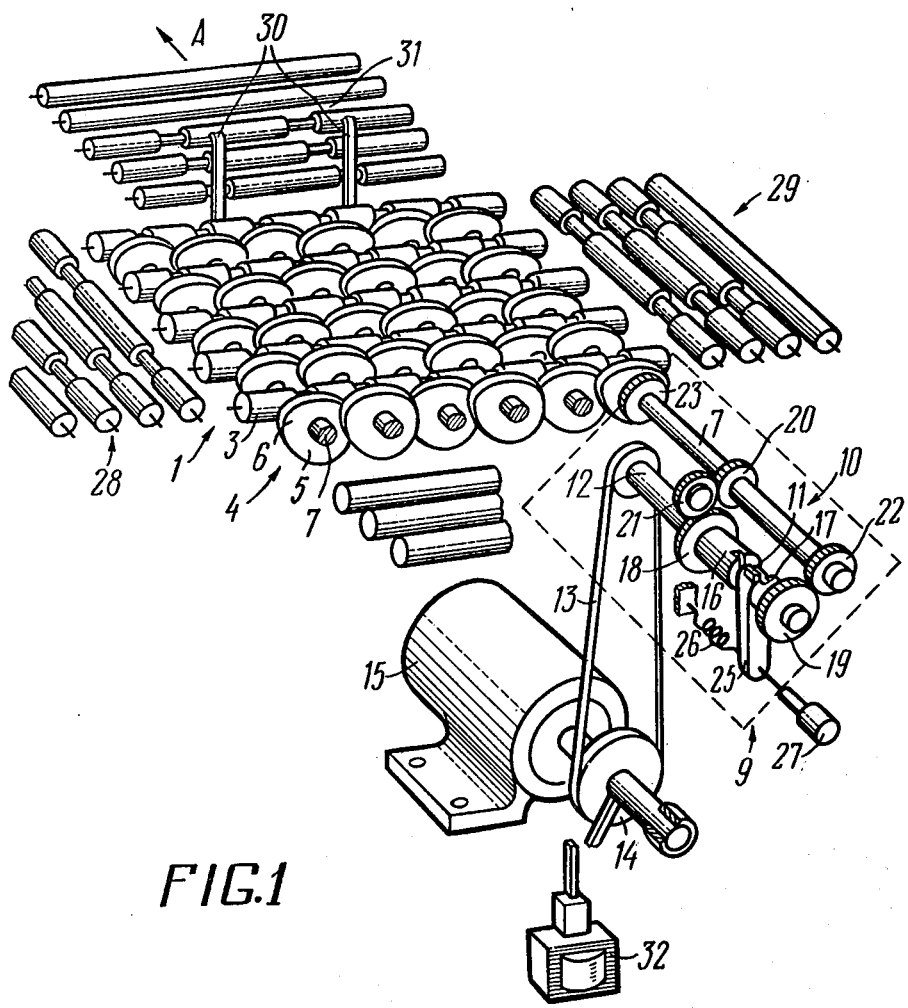
FIG. 1 shows schematically the general view of the apparatus for conveying piles of newspapers in directions perpendicular, in accordance with the invention.
Figure 2:
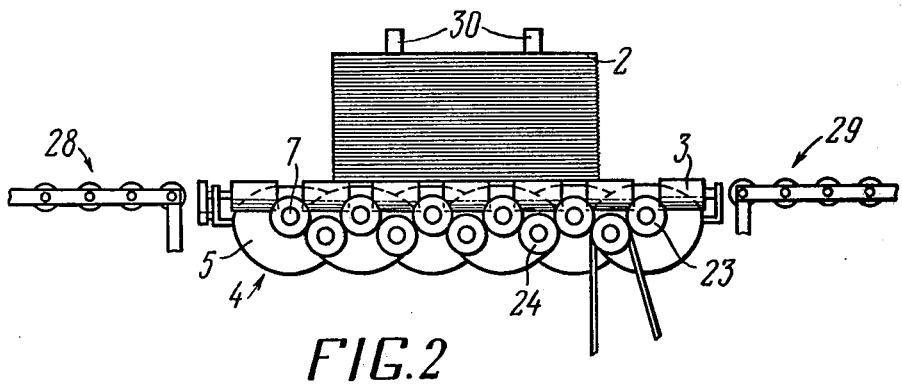
FIG. 2 illustrates the initial, or inoperative position of the discs employed in the apparatus.

Referring to the drawings, the apparatus includes a main rollerway 1 (FIG. 1) for conveying piles 2 (FIG. 2) of newspapers in a first direction, with discs 4 being mounted in the spaces between rollers 3 (FIG. 1) of the rollerway and the discs 4 are intended for directing the piles in a second direction perpendicular to the initial direction.

Figure 3:
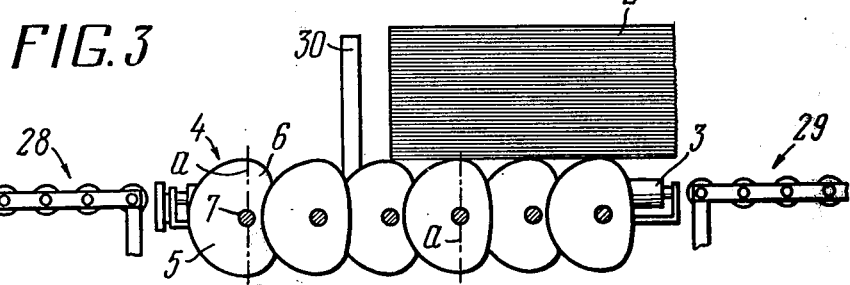
FIG. 3 depicts the discs in their operative position.
Figure 5:
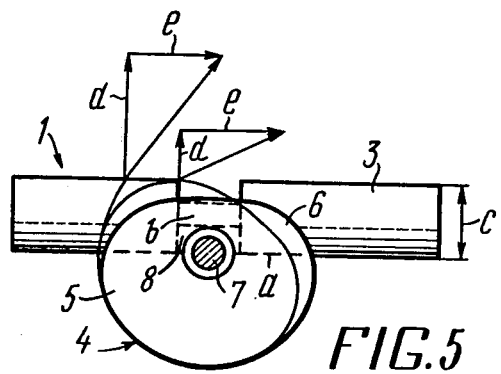

Each disc 4 in its radial section includes two portions of different profiles, a first portion 5 (FIG. 5) being a semi-circle, with a second portion 6 (FIG. 3) being a semi-ellipse. The line of bisection extends along a major axis $a$ of the original ellipse. The length of a minor axis $b$ (FIG. 5) of the semi-ellipse is shorter than a spacing $c$ between the axis of a shaft 7 supporting the discs 4, and the load-supporting surface of the rollerway 1. The length of the major axis $a$ of the ellipse equals the diameter of the semi-circle. The portions 5 and 6 smoothly conjugate with each other.

Figure 4:
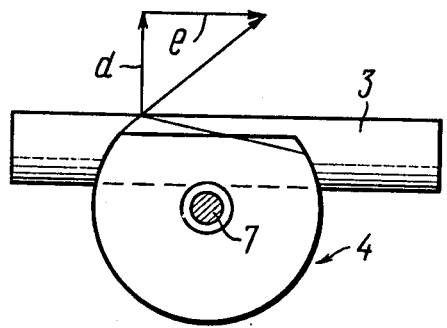
FIGS. 4, and 5 offer a comparison, in graphical form, of the stresses applied to a pile of papers by the discs of the known, and the herein disclosed apparatus at the moment of their contact.

Each of the shafts 7 extends perpendicularly to the rollers 3 of the rollerway 1 and each of the rollers 3 has therein a reduced-diameter portion or groove 8 in which a respective shaft 7 extends, with the reduced-diameter portions being such that the spacing between the axis of rotation of each shaft 7, and the load-supporting surface of the rollerway is minimal. This structural feature of the apparatus, and of the above described shape of the discs yield a reduction of the horizontal ($d$) and vertical ($e$) stresses applied to the pile at the initial moment of its contact with the discs, which can be seen in FIGS. 4 and 5. The reduction in stress is due to the fact that the discs 4, rotating their profiled portions 5 and 6 gradually engage the pile 2, thus preventing its being abruptly lifted.

All of the shafts 7 are associated with a common drive 9 (FIG. 1) thus providing for a synchronous rotation of the shafts. The discs are arranged in all the inter-roller spaces in a staggered, or checkered fashion, partly overlapping one another.

The drive 9 incorporates a two-way coupling 10 in which an engagement-controlling member 11 is keyed (not shown) to a shaft 12 connected through a V-belt transmission 13 and a single-revolution clutch 14 to a drive motor 15.

Half-couplings 16 and 17 of the two-way coupling 10 are freely rotatable about the shaft 12, and are rigidly connected, respectively, with gears 18 and 19, with the gear 18 being operatively connected with a gear 20 through an idler pinion 21, while the gear 19 directly meshes with a gear 22. The gears 20 and 22 are made fast with one of the shafts 7.

All the shafts 7 are interconnected through gear couples 23 and 24 of which the gears 23 are made fast with the shafts 7.

The engagement control member 11 of the two-way coupling 10 is operable by a bifurcated lever 25 to couple the half-coupling 16 with the shaft 12 under the action of a spring 26, or couple the half-coupling 17 with this shaft under the action of a solenoid 27.

At both sides of the main rollerway 1, there are arranged perpendicularly thereto, two receiving rollerways 28 and 29 in which the top plane of the rollers is at the same level with the top plane of the rollers 3 of the rollerway 1. The two receiving rollerways 28 and 29 adjoin the main rollerway 1 at the area of the arrangement of the means for redirecting the paper piles.

Mounted on the main rollerway 1 downstream of the discs 4, are a pair of stops 30 pivotable in a vertical plane by means of a solenoid (not shown), with these stops being projectable into the path of a pile advanced by the main rollerway in order to arrest this pile prior to its being transferred onto either one of the receiving rollerways 28 and 29.

The rollers 3 of the main rollerway 1, situated downstream of the stops 30, have reduced-diameter portions 31 or grooves therein into which the stops 30 are retracted to allow a pile of newspapers pass thereafter, which is not to be re-directed from the main rollerway 1 onto either one of the receiving rollerways 28 and 29.

Positioned between the rollers 3 of the rollerway 1 upstream of the stops 30 is a suitable sensor (not shown) capable of detecting the presence of a pile in the area of its re-directioning and feeds a corresponding signal to effect engagement of the single-revolution clutch, and thus to start rotation of the discs 4.

The present apparatus operates as follows:

If a pile advancing on the main rollerway 1 is not to be deflected onto either one of the receiving rollerways 28 and 29 (FIGS. 1 to 3), the rotatable stops 30 are retracted to rest in the reduced-diameter portions 31 of the rollers 3, and the pile unobstructedly moves along the main rollerway in the direction indicated by an arrow A.

If a pile 2 (FIGS. 2 and 3) is to be transferred, e.g. onto the rollerway 28, the solenoid 27 is energized, whereby the half-coupling 17 connects the shafts 7 with the discs 4 to the single-revolution clutch 14. Simultaneously, the solenoid (not shown) actuating the rotatable stops 30 is energized in order to rotate the stops into the vertical position.

The pile being advanced by the main rollerway comes into engagement with the stops 30, and operates the sensor (not shown), whereby the solenoid 32 is energized in order to engage the single-revolution clutch 14. The discs 4 start rotating in the direction toward the rollerway 28, and thus move the pile in a direction perpendicular to the direction of its initial motion without changing the indexing of the pile. The pile 2 is gradually lifted by the discs 4, and is transferred by their rotation onto the rollerway 28.

If the pile is to be transferred onto the rollerway 29, the above described sequence of operations is performed similarly, with the deflection of the pile toward the rollerway 29 being predetermined by the solenoid 27 remaining deenergized.

In this case, the discs 4 rotate toward the rollerway 29 due to the shafts 7 being connected to the clutch 14 through the idler pinion 21.

It can be seen from the above description that the present apparatus is of a simple structure, and provides a reliable transfer of piles of newspapers from a feeding rollerway to right angles to the rollerway.

What is claimed is:

1. An apparatus for conveying piles of newspapers in mutually perpendicular directions, including a main driven rollerway having a load supporting surface for conveying piles of newspapers in a first direction, the rollers of the main rollerway being mounted to provide a space between each pair of the adjacent ones of the rollers, rotatable drive shafts, and discs mounted on the rotatable drive shafts in the spaces and serving to convey the piles of newspapers in a second direction perpendicular to the first direction, the improvement that each roller of the main rollerway is provided with portions of reduced diameter, the number of the reduced portions being equal to the number of rotatable drive shafts, the rotatable drive shafts extending through the portions of reduced diameter under the main rollerway, each disc being constituted by two portions, one of the portions being a semi-circle and the other portion adjacent the one portion being a semi-ellipse, the length of the major axis thereof being equal to the diameter of the semi-circle, and the length of the minor axis thereof being shorter than the spacing between of the axis of the shaft and the load supporting surface of the main rollerway on which the pile of newspapers is being conveyed.

* * * * *